United States Patent
Lambright et al.

(10) Patent No.: US 9,798,731 B2
(45) Date of Patent: Oct. 24, 2017

(54) DELTA COMPRESSION OF PROBABILISTICALLY CLUSTERED CHUNKS OF DATA

(71) Applicant: Dell Products, LP, Round Rock, TX (US)

(72) Inventors: Henry Dan Lambright, Nashua, NH (US); Karthik Mynam, Nashua, NH (US)

(73) Assignee: Dell Products, LP, Round Rock, TX (US)

( * ) Notice: Subject to any disclaimer, the term of this patent is extended or adjusted under 35 U.S.C. 154(b) by 713 days.

(21) Appl. No.: 13/787,506

(22) Filed: Mar. 6, 2013

(65) Prior Publication Data

US 2014/0258248 A1 Sep. 11, 2014

(51) Int. Cl.
*G06F 17/30* (2006.01)

(52) U.S. Cl.
CPC .. *G06F 17/30135* (2013.01); *G06F 17/30156* (2013.01); *G06F 17/30159* (2013.01)

(58) Field of Classification Search
CPC ......... G06F 2212/401; G06F 17/30153; G06F 17/30156; G06F 17/30159; G06F 17/30162
USPC ........ 707/693, 640, 641, 692, 812; 711/161, 711/216
See application file for complete search history.

(56) References Cited

U.S. PATENT DOCUMENTS

| | | | | |
|---|---|---|---|---|
| 8,312,006 | B2 * | 11/2012 | Patterson | G06F 17/30312 707/713 |
| 8,447,740 | B1 * | 5/2013 | Huang | G06F 17/30156 707/640 |
| 8,463,787 | B2 * | 6/2013 | Kirshenbaum | G06F 17/30097 707/737 |
| 8,694,467 | B2 * | 4/2014 | Sun | G06F 17/30067 707/640 |
| 8,838,609 | B1 * | 9/2014 | Sharifi | G06F 17/3002 707/747 |
| 8,849,772 | B1 * | 9/2014 | Huang et al. | 707/692 |
| 8,898,120 | B1 * | 11/2014 | Efstathopoulos | 707/692 |
| 8,918,390 | B1 * | 12/2014 | Shilane et al. | 707/723 |
| 8,949,872 | B2 * | 2/2015 | Slaney | H04N 21/233 725/14 |
| 8,972,672 | B1 * | 3/2015 | Wallace et al. | 711/154 |
| 9,009,188 | B1 * | 4/2015 | Chechik | G06F 17/30247 382/305 |

(Continued)

OTHER PUBLICATIONS

Shilane, P., et al., "WAN Optimized Replication of Backup Datasets Using Stream-Informed Delta Compression," *10th USENIX Conference on Files and Storage Technologies* (2012).

(Continued)

*Primary Examiner* — Dangelino Gortayo
(74) *Attorney, Agent, or Firm* — Hamilton, Brook, Smith & Reynolds, P.C.

(57) ABSTRACT

The invention pertains to a method and Information Handling System (IHS) for performing delta compression on probabilistically clustered chunks of data. From a source of chunks a corresponding sketch to represent each chunk is generated. Then, from the generated sketches a subset of similar sketches is determined using a probabilistic based algorithm. Finally, delta compression is performed on the chunks which are represented by the similar sketches in the determined subset.

20 Claims, 4 Drawing Sheets

(56) References Cited

U.S. PATENT DOCUMENTS

| | | | |
|---|---|---|---|
| 9,043,316 B1* | 5/2015 | Murphy-Chutorian .. | G06K 9/46 707/723 |
| 2012/0137061 A1* | 5/2012 | Yang et al. ................... | 711/105 |
| 2013/0179650 A1* | 7/2013 | Hogstrom ............... | G06F 3/065 711/162 |
| 2013/0204905 A1* | 8/2013 | Ioffe ..................... | H04L 9/3236 707/803 |
| 2013/0318051 A1* | 11/2013 | Kumar .............. | G06F 17/30156 707/692 |
| 2014/0195499 A1* | 7/2014 | Amit ................ | G06F 17/30315 707/693 |

OTHER PUBLICATIONS

Joshua P. MacDonald, "File System Support for Delta Compression," (2000) (Master's Thesis, University of California at Berkeley, Department of Electrical Engineering and Computer Science).
Manber, U., "Finding Similar Files in a Large File System," *USENIX Winter 1994 Technical Conference Proceedings*, (1994).
Muthitacharoen, A., et al., "A Low-bandwidth Network File System," *SOSP '01: Proceedings of the 18th ACM Symposium on Operating Systems Principles*, pp. 174-187 (2001).
Broder, A.Z., "On the resemblance and containment of documents," *Compression and Complexity of Sequences: Proceedings, Positano, Amalfitan Coast, Salerno, Italy* (Jun. 11-13, 1997).
Andoni, A., et al., "Near-Optimal Hashing Algorithms for Approximate Nearest Neighbor in High Dimensions," *Communications of the ACM*, vol. 51 No. 1, pp. 117-122 (2008), doi:10.1145/1327452.1327494.

* cited by examiner

FIG. 3: Information Handling System

DELTA COMPRESSION OF PROBABILISTICALLY CLUSTERED CHUNKS OF DATA

BACKGROUND OF THE INVENTION

The increased use of technology and computers has generated a corresponding increase in digital data. This ever-increasing digital data requires a corresponding ever-increasing amount of storage space.

The need for storage space for digital data has been fueled through many changes in society. For example, Home computer users' increased storage of multimedia data, especially video and photographic data, has served to increase the amount of storage space needed. Likewise, industry also requires increased storage space. As more and more business is being conducted electronically, there has been an ever-increasing demand and need for the storage of this vast amount of business data. Furthermore, there has been a demand to digitize the storage of once paper files in an attempt to decrease the overhead cost of this paper generation and storage.

The need for increased storage space has been partly satisfied by simply increasing the number of storage devices used and by using storage devices with more capacity. For example, where computers once had hard drives capable of storing mere megabytes of data, many computers now come standard with a terabyte of storage capacity. Using more storage devices, and storage devices with increased capacity has somewhat alleviated storage needs, however, these methods do not help those who have reached storage capacity limits on their existing hardware.

Storing the data in a more efficient manner is one way to provide increased storage capacity on existing hardware. Compression is one such method of storing data in a more efficient manner. Compression is the process of representing information using fewer bits than the information's original representation. Compression is advantageous because it simply provides users with more storage space without having to add or upgrade additional storage devices. Previously stored data is simply stored in a more efficient manner, leaving additional free space on existing storage hardware.

While there is a need for methods to efficiently store digital data, there is also a need for methods of efficiently moving this same data. Moving data around requires extensive infrastructure. The infrastructure must correspondingly be increased and buttressed as it is being used to transfer more data. Again, rather than simply adding more infrastructure, or modifying existing infrastructure, methods can be used to transfer the same amount of information but in a more efficient manner. Again compression can be used to compress the data before the data is transferred.

While compression can be used to more efficiently store and transfer data, compression methods can be time and processor intensive.

SUMMARY OF THE INVENTION

Thus, an efficient method of data compression is needed. Embodiments of the present invention provide a method whereby delta compression is performed on probabilistically clustered chunks of data. Chunks of data are of variable lengths and are formed from objects (collections of a fixed number of bits) which represent portions of logical block addresses or files.

Compression is a way to represent information in a more efficient manner. One such method of compression is delta compression. Delta compression stores the difference between data, rather than the data itself. Thus, there is typically an original piece of data that is maintained, and then for subsequent pieces of data, only the "delta," i.e., the difference between the original piece of data and the subsequent piece of data is stored. However, in order for delta compression to be efficient, the pieces of data should be similar. If there are great variances between pieces of the data, corresponding deltas are large and delta compression may not be a more efficient manner of representing the information. Thus, an efficient manner for identifying similar pieces of data, prior to performing delta compression of the data is needed.

The present invention is directed to a method and apparatus for performing delta compression of multiple chunks of data. The method begins by generating a corresponding sketch to represent each chunk from a source of chunks. Next, from the generated sketches, a subset of similar sketches is determined using a probabilistic based algorithm. Finally, delta compression is performed on the chunks which are represented by the similar sketches in the determined subset.

Other embodiments of the method further include storing or transferring the delta compressed chunks. According to the principles of yet another embodiment of the invention, the method further comprises generating multiple sketches to represent each chunk in the source of chunks. The method of the present invention may further include generating the chunks using a hashing algorithm, such as the Rabin fingerprint algorithm. An embodiment of the method may even further compress the data by performing delta compression on the delta compressed chunks.

An embodiment of the invention further includes using an algorithm from the Locality Sensitive Hashing (LSH) family of algorithms, such as the MinHash algorithm, to generate the corresponding sketch to represent each chunk. According to an embodiment of the invention each sketch is a vector. Another embodiment of the present invention calls for a method where each sketch is a reference hash.

According to the principles of the present invention the chunks may be derived from files, logical block addresses, and/or a combination thereof. Further, in an embodiment of the invention each chunk is a variable length piece of data.

According to an embodiment of the invention, the probabilistic based algorithm used to determine the subset of similar sketches is an algorithm from the LSH family of algorithms.

Embodiments of the invention also provide for the delta compression to be a function of numerous tuned variables and/or a combination of tuned variables. For example, according to an embodiment of the invention the performance of the delta compression is a function of a user selected size of the sketches, a user selected size of each element of the sketches, a user selected number of sketches to generate for each chunk, a user selected average number of sketches in each subset of similar sketches, a user selected number of subsets of similar sketches to determine, an average size of each chunk, a threshold for performing delta compression on the chunks which are represented by the similar sketches in the determined subset, and tuning parameters of the probabilistic based algorithm.

According to another embodiment of the invention, the method further includes loading a set of segments into high speed memory when a number of similar chunks in the set of segments is greater than a threshold, wherein each segment is a fixed size division of an object, the object is a collection of bits of fixed size and each chunk is a variable size subset of those bits. This embodiment may further include determining the number of similar chunks in a set of segments, and/or determining a threshold for the number of similar chunks in a set of segments prior to loading the set of segments into high speed memory.

An embodiment of the present invention is directed to data integrity verification and further includes generating a first fingerprint for each chunk. Another embodiment verifies the integrity of the delta compressed chunks by first rebuilding the delta compressed chunks, then generating a corresponding fingerprint for each rebuilt chunk, and finally comparing the generated fingerprint for each rebuilt chunk with the corresponding first fingerprint. An example embodiment of the invention uses the SHA256 or MD5 algorithm to generate the fingerprints.

In another embodiment of the invention, an information handling system (IHS) for performing delta compression on multiple chunks of data is disclosed. The IHS comprises a source of chunks, a sketch generating module communicatively coupled to the source of chunks and configured to generate a corresponding sketch for each chunk, a grouping module configured to determine a subset of similar sketches from the generated sketches using a probabilistic based algorithm, and a compression module communicatively connected to the grouping module and configured to perform delta compression on the chunks which are represented by the similar sketches in the determined subset.

The IHS may further include a storage device for storing the delta compressed chunks and/or a network interface module configured to transfer the delta compressed chunks. In another embodiment of the HIS, the source of chunks is a chunk generation module that generates the chunks using a hashing algorithm on a collection of bytes. Yet another embodiment of the IHS includes a tuning module configured to allow a user to select an average size of each chunk, select a size of each sketch, select a size of each element of the sketches, select a number of sketches to generate for each chunk, select a number of sketches in each subset of similar sketches, select a number of subsets of similar sketches to determine, tune parameters of the probabilistic based algorithm, and set a threshold for performing delta compression on the chunks which are represented by the similar sketches in the determined subset.

Another embodiment of the IHS includes an integrity verification module which is configured to generate a first fingerprint for each chunk. In yet another embodiment, the integrity verification module is configured to verify the integrity of the delta compressed chunks by rebuilding the delta compressed chunks, generating a corresponding fingerprint for each rebuilt chunk, and comparing the generated fingerprint for each rebuilt chunk with the corresponding first fingerprint.

In other embodiments of the invention the IHS and its various components are configured to operate in a manner corresponding to the above described method and its various embodiments.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
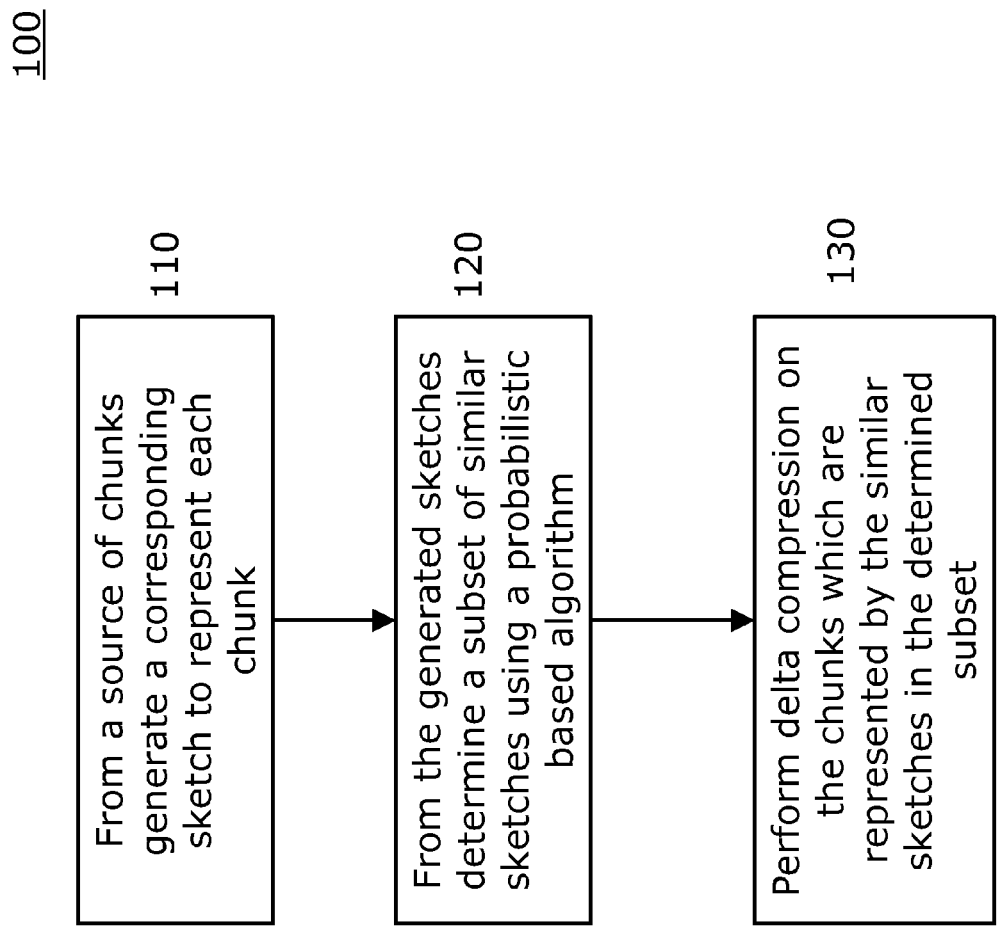
FIG. 1 is a flow chart of a method of performing delta compression of multiple chunks of data according to the principles of the present invention.

FIG. 1 is a flow diagram of a method 100 of performing delta compression on multiple chunks of data. The method 100 begins with a source of chunks and from this source of chunks generating a corresponding sketch to represent each chunk (110). Next, from the generated sketches, a subset of similar sketches is determined using a probabilistic based algorithm (120). Finally, delta compression is performed on the chunks which are represented by the similar sketches in the determined subset (130).

The method 100 begins with a source of chunks. A chunk may represent some variable length piece of data. According to an embodiment of the invention, chunks are derived from objects. An object is a collection of bits of data, the collection being of some fixed size. Objects may be derived from files, Logical Block Addresses (LBAs), and/or any combination thereof. An object can be further subdivided into segments, which are fixed size divisions of the object. These segments may be further subdivided into the variable length "chunks." In summary, according to an embodiment of the invention an object is a collection of bits of some fixed size, segments are fixed size divisions of objects, and chunks are variable size subdivisions of segments. Through this chain of inheritance, a chunk may be derived from files, LBAs, and/or any combination thereof. A source of chunks is a plurality of such above described chunks.

From the source of chunks the method 100 at step 110 generates a corresponding sketch to represent each chunk. A sketch is a reference hash, which may be a short vector of numbers used to represent a chunk. According to an embodiment of the invention, each sketch is a vector of numbers. The sketches may be generated in any way that is known in the art, such as using an algorithm from the Locality Sensitive Hashing (LSH) family of algorithms or an algorithm of similar type. One such example algorithm from the LSH family of algorithms is the MinHash algorithm.

After a sketch is generated for each chunk from the source of chunks the next step 120 of the method 100 is to determine a subset of similar sketches using a probabilistic based algorithm. Any probabilistic based algorithm known in the art may be used to determine the subset of similar sketches. In an embodiment of the invention, the probabilistic based algorithm used is an algorithm from the LSH family of algorithms. In an alternative embodiment of the method 100, multiple subsets of similar sketches are determined using a probabilistic based algorithm.

The final step 130 of the method 100 is to perform delta compression on the chunks which are represented by the similar sketches in the determined subset. The determined subset is the subset of similar sketches determined by or otherwise resulting from step 120 of the method 100. As described above, delta compression is a method of efficiently representing data wherein the differences between the pieces of data, in this case the chunks corresponding to the determined subset of step 120, rather than the data itself is stored. Thus, typically there is an original piece/chunk of data that is maintained, and then for each subsequent piece/chunk of data, only the "delta," i.e., the difference between the original piece/chunk of data, and the subsequent piece/chunk of data is stored. In an embodiment of the invention, when performing delta compression on the chunks, a given chunk is kept as the original chunk, and then for all other chunks only a delta is maintained by the step 130.

The method 100 performs delta compression of the chunks efficiently because similar chunks are identified and the delta compression is done on these identified similar chunks. Because delta compression typically only stores the delta, i.e., the difference between an original piece of data and all subsequent pieces of data, it is advantageous for the deltas to be as small as possible. Thus, it is advantageous to perform delta compression on pieces of data that are similar. By generating a sketch for each chunk of data, at 110, and then determining a subset of similar sketches, at 120, the method 100 identifies the similar sketches. Because the similar sketches are identified, so too are the similar chunks because each chunk is represented by a sketch generated in the same manner. Performing delta compression on the chunks which are represented by the similar sketches in the determined subset ensures that the delta compression is efficient because there is a high probability that the necessary deltas should all be relatively small due to the chunks being similar.

An alternate embodiment of the method 100 further comprises storing the delta compressed chunks. The delta compressed chunks may be stored on any storage device that is known in the art. Using the method 100 to store data helps to increase the capacity of storage devices. This is particularly advantageous because it generates more storage space on existing hardware. Another example embodiment of the method 100 includes further compressing the delta compressed chunks. Any compression technique that is known in the art may be used to further compress the delta compressed chunks.

An alternative embodiment of the method 100 includes transferring the delta compressed chunks. It is more efficient to transfer the delta compressed chunks rather than the chunks of data themselves because the delta compressed chunks are a more efficient representation of the same information. The delta compressed chunks of data may be transferred across any type of network known in the art, including Wide Area Networks (WANs) and/or Local Area Networks (LANs). Transferring the delta compressed chunks, rather than the chunks themselves, allows for faster transfers and similarly transfers requiring less bandwidth.

In yet another embodiment, the method 100 further comprises generating multiple sketches to represent each chunk from the source of chunks. Sketch generation is typically done using a randomized process, therefore it is likely that every time a sketch is generated for a given chunk a different sketch results. Thus, in an embodiment of the method 100, multiple sketches are generated for each chunk from the source of chunks so that at least two sketches are generated for each chunk. After generating multiple sketches for each chunk, the next step 120 of the method 100 is to determine a subset of similar sketches using a probabilistic based algorithm. A subset of similar sketches is determined so that similar chunks can be identified and so when delta compression is performed on these chunks, the compression is efficient. Generating multiple sketches for each chunk makes identifying similar chunks more probable and thus performing delta compression more efficient.

To illustrate, let's start with a scenario with two data chunks A and B, each represented by multiple sketches. Sketches 1 and 2 represent chunk A and sketches 3 and 4 represent chunk B. If at the step 120 of the method 100, it is determined that sketches 1 through 4 are all similar, it is extremely likely that chunks A and B are similar. Then when delta compression is performed on these chunks of data it is likely very efficient. In the above scenario, it may alternatively be determined that only sketches 1 and 3 are similar, in such a case, in an embodiment of the method 100, the chunks A and B may be considered poor candidates for delta compression. According to the principles of an embodiment of the invention, the method 100 may be tuned to alter the number of sketches to be generated for each chunk. Increasing the number of sketches generated for each chunk may increase the accuracy of the method, but may also increase the processing time, these variables may be traded off and the number of sketches to generate for each chunk selected accordingly.

Another embodiment of the method 100 generates the chunks in the source of data chunks. This may be done using a hashing algorithm on a collection of bytes. In an embodiment of the invention, the hashing algorithm used is a Rabin fingerprint algorithm.

As described hereinabove, the method 100 performs delta compression on chunks of data. A chunk is a variable size collection of bits, which may be derived from an object. An object may be further divided into segments, which are fixed size divisions of an object. An object is a collection of bits of fixed size, and chunks are simply variable size subsets of that collection of bits. In order to perform delta compression on the chunks, the chunks must be accessed. For example, if the chunks are on a hard disk drive, there must be a disk access to retrieve each data chunk. These accesses can be time and processor intensive. Thus, and embodiment of the invention further comprises loading a set of segments into high speed memory when a number of similar chunks in the set of segments are determined to be similar. In yet another embodiment of the invention, an object is loaded into high speed memory when a number of similar chunks in the object are determined to be similar. These embodiments help to reduce the number of disk accesses required to perform the method.

Another embodiment of the invention further comprises determining the number of similar chunks in a set of segments or an object. In yet another embodiment of the method, the user selects the threshold number of similar chunks in a set of segments or an object at which the set of segments or the object is loaded into high speed memory.

Embodiments of the method 100 may also be tunable based upon user preferences. Any number of parameters may be tuned alone or in combination to affect the results and performance level of the method 100. For example, according to the principles of an embodiment of the invention the size of the chunks of data may be tuned. In yet another embodiment, the size of the generated sketches representing each chunk is a tunable parameter. For example, where each sketch is a vector, the dimensions of these vectors may be tuned by a user. Similarly, the number of bytes in each element of the vector may be a separately tunable parameter. Further, a user may select a number of sketches to generate for each chunk.

According to an embodiment of the method 100, a user may tune the step 120 of determining a subset of similar sketches. For example, a user may select an average number of sketches in each subset of similar sketches. Similarly, a user may select the number of subsets of similar sketches to determine.

In yet another embodiment of the method 100, the process of performing delta compression on the chunks is tunable. As described herein, delta compression stores the difference between an original chunk of data and a subsequent chunk of data. While the method 100 attempts to identify similar chunks so that resulting deltas are small, this may not always be possible. Therefore, in an embodiment of the invention the threshold for storing a delta versus simply storing the actual chunk is a tunable parameter. Thus, a user may determine at which size delta she would prefer to store the chunk of data itself.

In another embodiment of the method 100, a user tunes the probabilistic function. For example, if the probabilistic function used to determine the subset of similar sketches is an algorithm from the LSH family of algorithms, the user may tune the algorithm to affect the probability of finding similar sketches. In yet another embodiment, the user determines the number of sketches to generate for each chunk as described hereinabove.

Figure 2:
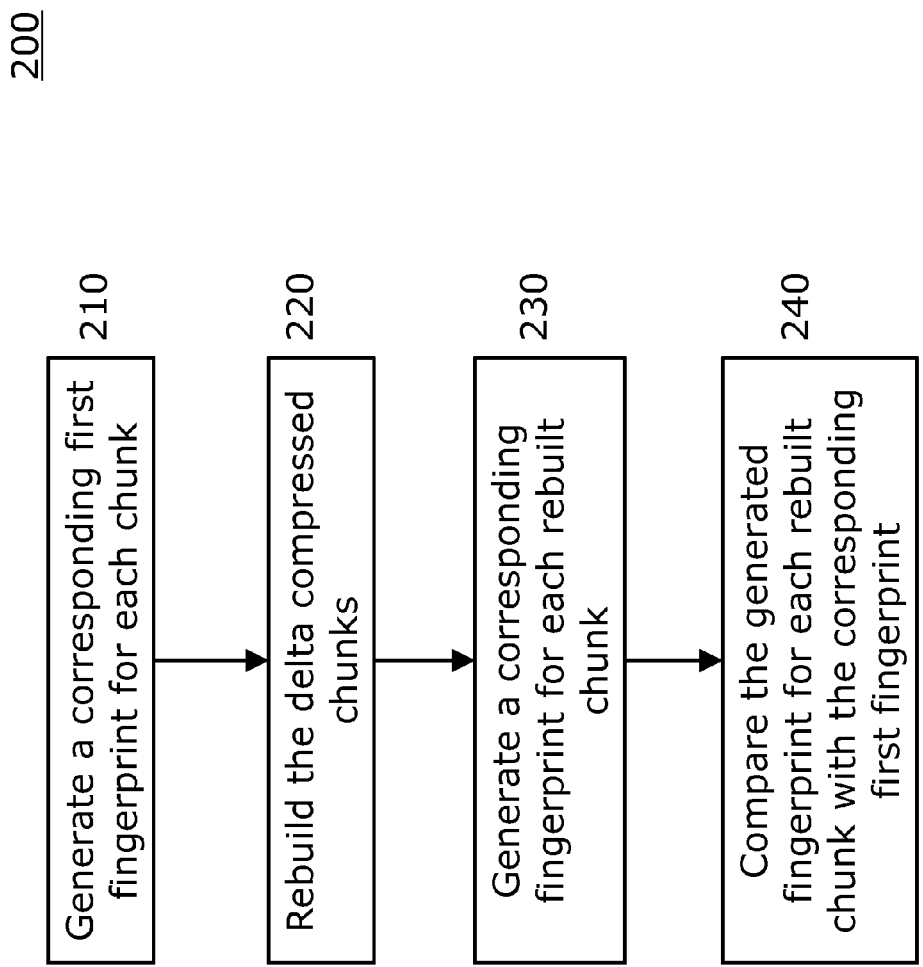
FIG. 2 is a flow chart depicting a method of verifying the integrity of delta compressed chunks according to an embodiment of the present invention.

FIG. 2 depicts a method 200 of performing data verification of the delta compressed chunks according to principles of the current invention. The method 200 begins with step 210, generating a first fingerprint for each chunk of data. A fingerprint is a short code for a chunk that is highly probable to be unique. Next, the delta compressed chunks are rebuilt by step 220. After step 220, rebuilding the delta compressed chunks, a corresponding fingerprint is generated for each rebuilt chunk via step 230. Finally, step 240 compares the first fingerprints of step 210 to the corresponding fingerprints generated by step 230 for each rebuilt chunk.

The method 200 allows for data verification in at least two ways. First, if the delta compressed chunks cannot be rebuilt, then it is known that the data resulting from delta compression processing is corrupted. Second, the integrity of the data is verified by comparing the first fingerprint of each chunk with the corresponding fingerprints of the rebuilt delta compressed chunks. The first fingerprints and the fingerprints of the rebuilt chunks may be generated in any way that is known in the art, for example using the SHA256 or MD5 algorithms.

Another embodiment of the invention uses the first fingerprints resulting from step 210 of the method 200 to identify duplicate and identical chunks. In such an embodiment, the corresponding first fingerprint for a respective chunk is compared with the corresponding first fingerprint for another respective chunk. If these two first fingerprints are the same, there is an extremely high probability that the respective chunks are the same. Thus, by comparing the respective fingerprints of the chunks, an embodiment of the invention may identify duplicate and identical chunks. Similarly, duplicate and identical rebuilt delta compressed chunks can be identified by comparing the fingerprints of the rebuilt delta compressed chunks that result from step 230 of the method 200. According to yet another embodiment of the invention, at step 240 of the method 200, identical chunks are identified by comparing the first fingerprints resulting from step 210, to the corresponding fingerprints for each rebuilt chunk resulting from step 230.

Figure 3:
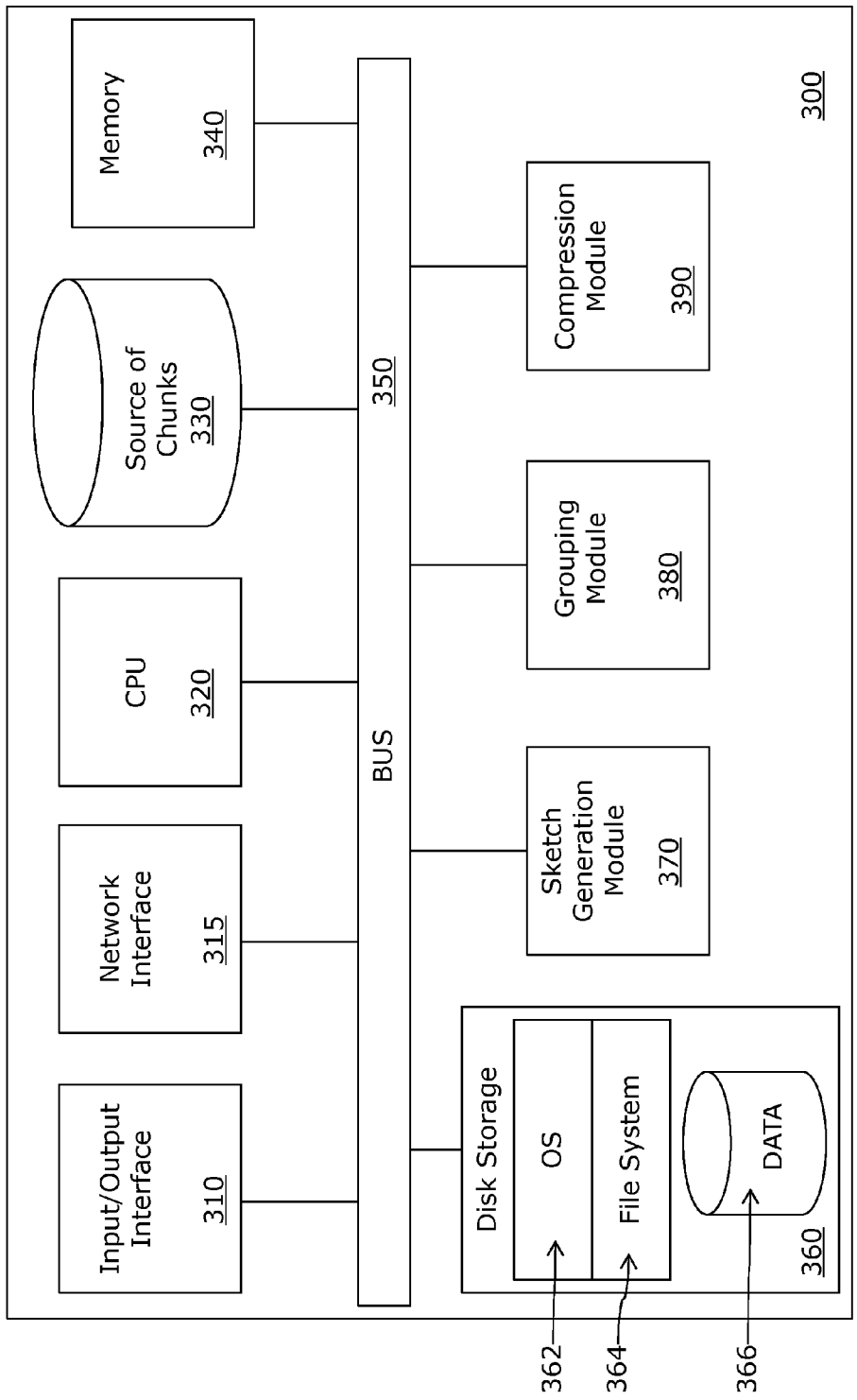
FIG. 3 is a simplified block diagram of an Information Handling System (IHS) configured to perform delta compression on multiple chunks of data.

FIG. 3 is a high level block diagram of an information handling system (IHS) 300 that performs delta compression on multiple chunks of data according to the principles of the present invention. The IHS 300 contains a bus 350. The bus 350 is a connection between the various components of the IHS 300. Connected to the bus 350 is an input/output device interface 310 for connecting various input and output devices, such as a keyboard, mouse, display, speakers, etc. to the IHS 300. Further connected to the bus 350 is a network interface 315 for connecting the IHS 300 to the various networks that are known in the art. In an embodiment of the invention, the IHS 300 remotely connects to a source of chunks via the network interface 315. According to another embodiment of the IHS 300, the network interface 315 is configured to transfer data, including delta compressed chunks. Central Processing Unit (CPU) 320 is connected to the bus 350 and provides for the execution of computer instructions. Memory 340 provides volatile storage for data used for carrying out computer instructions. Disk storage 360 provides non-volatile storage for software instructions such as the operating system (OS) 362 and the data 366. Coupled with the OS 362, is the file system 364. Disk storage 360 may be any storage device known in the art.

IHS 300 further comprises a source of chunks 330. In an embodiment of the invention the data 366 comprises a source of chunks. While two examples of possible sources of chunks, the source of chunks 330 and the data 366 are shown, the IHS 300 could comprise any number of sources of chunks and may be connected to various remotely located sources of chunks via the network interface 315.

IHS 300 also comprises sketch generation module 370. The sketch generation module 370 is communicatively connected to the source of chunks 330 via the bus 350. The sketch generation module 370 may also be configured to generate sketches for chunks located in the disk storage 360 and/or sources of chunks that are remotely located and accessible via the network interface 315. According to an embodiment of the IHS 300, the sketch generation module 370 is further configured to generate multiple sketches for each chunk. In an embodiment, the sketch generation module 370 is configured to use an algorithm from the LSH family of algorithms, such as the MinHash algorithm, to generate the corresponding sketch to represent each respective chunk.

Further connected to the bus 350 is a grouping module 380. The grouping module 380 is configured to determine a subset of similar sketches from the sketches generated by the sketch generation module 370. The grouping module 380 uses a probabilistic based algorithm to determine the subset of similar sketches. In an embodiment of the invention, the probabilistic based algorithm, used by the grouping module 380 to determine the subset of similar sketches, is an algorithm from the LSH family of algorithms. In another embodiment of the invention, the grouping module 380 is configured to determine multiple subsets of similar sketches from the generated sketches.

Further coupled to the IHS 300 is a compression module 390. The compression module 390 is communicatively connected to the grouping module 380. The compression module 390 is configured to perform delta compression on the chunks which are represented by the subset of similar sketches determined by the grouping module 380. In an embodiment of the invention, the compression module 390 may be configured to further compress the delta compressed chunks using any compression technique that is known in the art.

The IHS 300 and its various components and modules work in conjunction to perform delta compression on probabilistically clustered chunks of data. In an example operation of the IHS 300, the sketch generation module 370 accesses the source of chunks 330, and generates a corresponding sketch to represent each respective chunk. Next, the grouping module 380 accesses the generated sketches and determines a subset of similar sketches using a probabilistic based algorithm. Finally, the compression module 390 performs delta compression on the chunks which are represented by the similar sketches in the determined subset.

An alternate embodiment of the IHS 300 comprises a storage device configured to store the chunks of data compressed by the compression module 390. In another embodiment, the delta compressed chunks are stored in disk storage 360 and in yet another embodiment, the delta compressed chunks are stored on a remotely located storage device which is accessible via the network interface 315.

According to an embodiment of the IHS 300, the source of chunks is a chunk generation module configured to generate the chunks using a hashing algorithm on a collection of bytes. The chunk generation module may use the Rabin fingerprint algorithm to generate the chunks.

The IHS 300 may also include a tuning module. The tuning module is configured to allow a user to tune a multitude of parameters that vary the performance of the delta compression of the chunks which are represented by the subset of similar sketches. For example, the tuning module allows a user to select an average size of each chunk, select a size of each sketch, select a size of each element within each sketch, select a number of sketches to generate for each chunk, select a number of sketches in each subset of similar sketches, and select a number of subsets of similar sketches to determine. The tuning module may also allow a user to tune parameters of the probabilistic based algorithm used by the grouping module 380 to determine the subset of similar sketches. Through the tuning module, a user may also vary the threshold for storing a delta versus simply storing the original data.

The IHS 300 may further include an integrity verification module configured to verify the integrity of the delta compressed chunks. The integrity verification module is configured to generate a first fingerprint for each chunk. The integrity verification module is further configured to rebuild the delta compressed chunks, generate a corresponding fingerprint for each rebuilt chunk, and compare the generated fingerprint for each rebuilt chunk with the corresponding first fingerprints. The integrity verification module may generate the first fingerprint and fingerprint for each rebuilt chunk in any manner that is known in the art. For example, the data integrity verification module may generate the fingerprints using the SHA256 or MD5 algorithms.

Another example embodiment of the IHS 300 comprises a controller. The controller may be configured increase the efficiency of performing delta compression on the multiple chunks of data. In an embodiment of the invention, the controller is configured to load a set of segments into high speed memory when a number of similar chunks in the set of segments is greater than a threshold. In yet another embodiment, the controller is configured to load an object into high speed memory when a number of similar chunks in the object is greater than a threshold. The controller may be further configured to determine the number of similar chunks in a set of segments or in an object.

It should be understood by a person of ordinary skill in the art that the IHS 300 may be implemented in various forms. The respective components and modules of the IHS 300 may be combined in any manner that is known in the art and may be implemented in any combination of hardware and software. For example, the above described components, modules, and controller may be executable instructions in memory 340 or operating system 362 operated on by CPU 320. Further, the IHS 300 and its various components may be configured to operate in a manner corresponding to the above described method 100 and its various embodiments.

Figure 4:
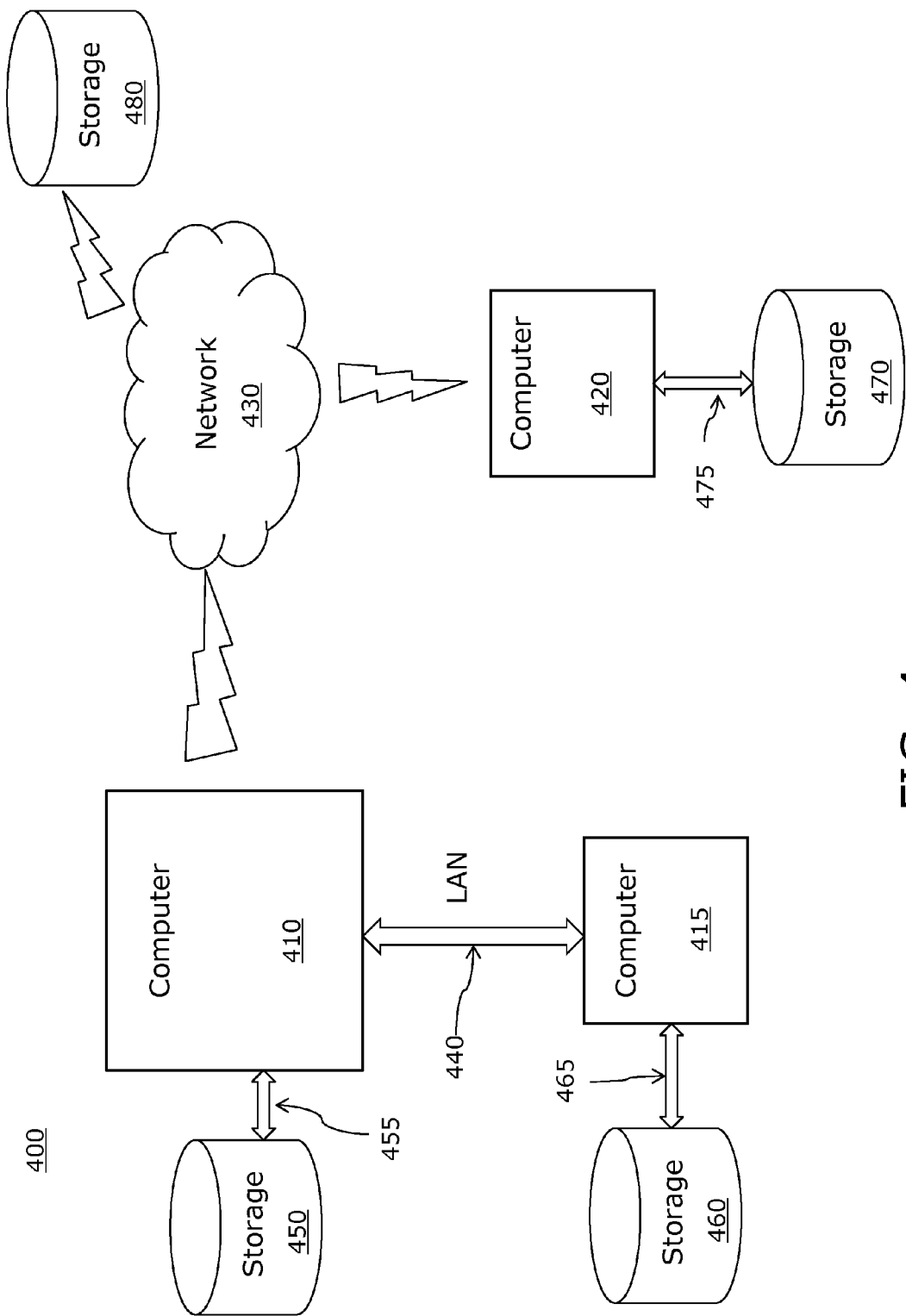
FIG. 4 depicts a computer network in which the present invention may be implemented.

FIG. 4 illustrates a computer network environment 400 in which the present invention may be implemented. The computers 410 and 415 are linked through local area network (LAN) 440. Further, the computer 410 and the computer 420 are linked through the network 430. The network 430 may be any network that is known in the art, including a wide area network (WAN). Computers 410, 415, and 420 may embody IHS 300. Computers 410, 415, and 420 may be further connected via interconnects 455, 465, and 475, to remote storage devices 450, 460, and 470 respectively. The remote storage devices 450, 460, and 470 may contain chunks of data and may also be configured to store data in any form that is known in the art. Network 430 may also be similarly connected to remote storage device 480. Computers 410, 415, and 420 may access chunks of data from storage device 480 as well as may store delta compressed data results of the IHS 300.

It should be understood that the example embodiments described above may be implemented in many different ways. In some instances, the various methods and machines described herein may each be implemented by a physical, virtual, or hybrid general purpose computer. A general purpose computer may be transformed into the machines that execute the methods described above, for example, by loading software instructions into memory or non-volatile storage for execution by a central processing unit.

Embodiments or aspects thereof may be implemented in the form of hardware, firmware, or software, or any combination thereof. If implemented in software the software may be stored on any non-transient computer readable medium that is configured to enable a processor to load the software or subsets of instructions thereof. The processor then executes the instructions and is configured to operate or cause an apparatus to operate in a manner as described herein.

While this invention has been particularly shown and described with references to example embodiments thereof, it will be understood by those skilled in the art that various changes in form and details may be made therein without departing from the scope of the invention encompassed by the appended claims.

What is claimed is:

1. A method of performing delta compression of multiple chunks of data, the method comprising:
   from a source of chunks, generating multiple sketches to represent each chunk using a randomized process;
   from the generated sketches, determining a subset of similar sketches based on a probabilistic based function; and
   performing delta compression on the chunks of the source of chunks which are represented by the similar sketches in the determined subset, performing the delta compression including storing a given chunk from the source of chunks which are represented by the similar sketches in the determined subset and storing deltas for chunks, other than the given chunk, from the source of chunks which are represented by the similar sketches in the determined subset.

2. The method of claim 1 wherein the deltas are differences between the given chunk and the chunks, other than the given chunk, from the source of chunks which are represented by the similar sketches in the determined subset.

3. The method of claim 1 further comprising:
   transferring the delta compressed chunks.

4. The method of claim 1 wherein each chunk is derived from files, logical block addresses, and/or a combination thereof.

5. The method of claim 1 wherein each chunk is a variable length piece of data.

6. The method of claim 1 further comprising:
generating the chunks using a hashing function on a collection of bytes.

7. The method of claim 6 wherein the hashing function is a Rabin fingerprint.

8. The method of claim 1 wherein each sketch is a vector.

9. The method of claim 1 wherein performance of the delta compression is a function of one or more of the following:
a user selected size of the sketches;
a user selected size of each element of the sketches;
an average size of each chunk;
a user selected number of sketches to generate for each chunk;
a user selected number of sketches in the subset of similar sketches;
a user selected number of subsets of similar sketches to determine;
tuning parameters of the probabilistic based function; and
a threshold for performing delta compression on the chunks which are represented by the similar sketches in the determined subset.

10. The method of claim 1 wherein each sketch is a reference hash.

11. The method of claim 1 further comprising generating the multiple sketches to represent each chunk by employing a function from the Locality Sensitive Hashing (LSH) family of functions.

12. The method of claim 1 wherein the probabilistic based function used to determine the subset of similar sketches is a function from the LSH family of functions.

13. The method of claim 1 further comprising:
performing further compression on the delta compressed chunks.

14. The method of claim 1 further comprising:
generating a corresponding first fingerprint for each chunk.

15. The method of claim 14 further comprising:
verifying the integrity of the delta compressed chunks by:
rebuilding the delta compressed chunks;
generating a corresponding fingerprint for each rebuilt chunk; and
comparing the generated fingerprint for each rebuilt chunk with the corresponding first fingerprints.

16. The method of claim 15 wherein the first fingerprint for each chunk and the fingerprint for each rebuilt chunk is generated using a SHA256 or a MD5 function.

17. The method of claim 1 further comprising:
loading a set of segments into high speed memory when a number of similar chunks in the set of segments is greater than a threshold, wherein each segment is a fixed size division of an object, the object is a collection of bits of fixed size and each chunk is a variable size subset of those bits.

18. An Information Handling System (IHS) comprising:
a processor; and
a memory with computer code instructions stored therein, the memory operatively coupled to said processor such that the computer code instructions configure the processor to implement:
a source of chunks;
a sketch generating module communicatively connected to the source of chunks and configured to generate multiple sketches for each chunk using a randomized process;
a grouping module configured to determine a subset of similar sketches from the generated sketches using a probabilistic based function; and
a compression module communicatively connected to the grouping module and configured to perform delta compression on the chunks which are represented by the similar sketches in the determined subset, performing the delta compression including storing a given chunk from the source of chunks which are represented by the similar sketches in the determined subset and storing deltas for chunks, other than the given chunk, from the source of chunks which are represented by the similar sketches in the determined subset.

19. The IHS of claim 18 wherein each chunk is derived from files, logical block addresses, and/or a combination thereof, each chunk being a variable length piece of data generated using a hashing function on a collection of bytes.

20. The IHS of claim 18 wherein the deltas are differences between the given chunk and the chunks, other than the given chunk, from the source of chunks which are represented by the similar sketches in the determined subset.

* * * * *